United States Patent
Aoyama (10) Patent No.: US 7,628,073 B2
(45) Date of Patent: Dec. 8, 2009

(54) PHYSICAL QUANTITY SENSOR

(75) Inventor: Seiki Aoyama, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 99 days.

(21) Appl. No.: 11/979,322

(22) Filed: Nov. 1, 2007

(65) Prior Publication Data

US 2008/0216572 A1    Sep. 11, 2008

(30) Foreign Application Priority Data

Mar. 6, 2007    (JP)    ............................ 2007-55649

(51) Int. Cl.
*G01P 15/125*    (2006.01)
*G01P 9/04*    (2006.01)
*G01P 21/00*    (2006.01)

(52) U.S. Cl. .................... 73/514.32; 73/504.14; 73/1.38

(58) Field of Classification Search .............. 73/514.32, 73/514.29, 514.36, 514.38, 504.12, 504.14, 73/1.38

See application file for complete search history.

(56) References Cited

U.S. PATENT DOCUMENTS

| | | | |
|---|---|---|---|
| 6,257,061 B1 | 7/2001 | Nonoyama et al. | |
| 6,450,029 B1 | 9/2002 | Sakai et al. | |
| 6,668,614 B2 | 12/2003 | Itakura | |
| 6,694,814 B2* | 2/2004 | Ishio | 73/514.32 |
| 7,072,777 B1 | 7/2006 | Wakui et al. | |
| 7,168,320 B2 | 1/2007 | Murata et al. | |
| 7,302,847 B2* | 12/2007 | Ito et al. | 73/504.14 |
| 7,418,864 B2* | 9/2008 | Asami et al. | 73/514.32 |
| 2007/0236231 A1* | 10/2007 | Hattori | 324/679 |

FOREIGN PATENT DOCUMENTS

| | | |
|---|---|---|
| JP | A-05-322925 | 12/1993 |
| JP | A-09-159692 | 6/1997 |

* cited by examiner

*Primary Examiner*—Helen C. Kwok
(74) *Attorney, Agent, or Firm*—Posz Law Group, PLC

(57) ABSTRACT

A physical quantity sensor includes: a substrate; a movable element; two fixed elements; a carrier wave application element for applying two carrier waves to the fixed elements; a signal application element for applying a middle voltage to the movable element; and a detection circuit for detecting a physical quantity. The detection circuit executes a first self diagnosis process when the signal application element further applies a first self diagnosis signal to the movable element. The first self diagnosis signal has a first frequency for obtaining a resonant magnification equal to or larger than 1.1 times with respect to a resonant frequency of the movable element, so that the movable element is resonated and almost contacts or press contacts one fixed element. The detection circuit determines whether a sticking phenomenon occurs when the signal application element applies the first self diagnosis signal.

7 Claims, 4 Drawing Sheets

PHYSICAL QUANTITY SENSOR

CROSS REFERENCE TO RELATED APPLICATION

This application is based on Japanese Patent Application No. 2007-55649 filed on Mar. 6, 2007, the disclosure of which is incorporated herein by reference.

FIELD OF THE INVENTION

The present invention relates to a physical quantity sensor.

BACKGROUND OF THE INVENTION

A physical quantity sensor such as an acceleration sensor and a yaw rate sensor detects physical quantity by measuring capacitance change. For example, a semiconductor acceleration sensor controls operation of an airbag system in a vehicle. The sensor includes a sensor chip having a movable electrode and a pair of fixed electrodes. The movable electrode is supported on a substrate with a spring so that the movable electrode is movable in accordance with acceleration applied to the sensor. Each fixed electrode is disposed apart from the movable electrode by a predetermined distance therebetween in a movable direction of the movable electrode. A carrier wave having a pulse shape is applied to each fixed electrode. Each carrier wave has a voltage, i.e., amplitude of 5 volts, and a phase, which is opposite to each other. A middle voltage of 2.5 volts is applied to the movable electrode. The acceleration is detected by measuring capacitance change between the movable electrode and the fixed electrode.

The acceleration sensor has a self diagnosis function for determining whether the sensor functions normally. For example, the sensor diagnoses whether a predetermined sensitivity is obtained or whether a foreign particle is inserted into a clearance of the sensor chip. The self diagnosis function is disclosed in, for example, U.S. Pat. No. 6,257,061. This function works in such a manner that the voltage to be applied to the movable electrode is switched from 2.5 volts to 4 volts when the sensor self diagnoses. By switching the voltage, strong electrostatic force is generated between one of the fixed electrodes and the movable electrode, so that the movable electrode is forcibly moved, i.e., displaced. The movement is converted into a voltage signal by a converter circuit in order to determine whether a predetermined voltage corresponding to the movement is obtained.

In the above function, the movable electrode is moved only to one side (e.g., to +X direction). Accordingly, the sensor cannot detect anomaly on the other side (i.e., on −X direction). In view of this point, another self diagnosis function is disclosed in U.S. Pat. No. 6,450,029. When the sensor self diagnoses, the frequency of the self diagnosis signal to be applied to the movable electrode is set in a range between a resonant frequency multiplied by 0.2 and the resonant frequency multiplied by 1.4. In this case, resonant magnification is equal to or larger than 1.0. Thus, the movable electrode is moved to each side; and therefore, the sensor can detect anomaly on both sides.

One of anomaly caused in the physical quantity sensor is sticking anomaly, which provides that the movable electrode contacts and adheres to the fixed electrode. The sticking anomaly is caused by an electrical factor of one electrode or a surface factor such as foreign particle or moisture on the surface of one electrode when excess acceleration is applied to the sensor or when the sensor is manufactured in a manufacturing process. The above self diagnosis function cannot detect the sticking anomaly.

Thus, it is required to determine whether the sticking anomaly is occurred. To determine whether the sticking anomaly is occurred (i.e., to perform a sticking diagnosis), the movable electrode forcibly contacts the fixed electrode. Then, the voltage is applied so as to separate the movable electrode from the fixed electrode. In this case, it is determined whether the movable electrode returns to a predetermined position. However, the forced displacement of the movable electrode becomes comparatively large when the movable electrode forcibly contacts. To obtain the large displacement, in general, a high voltage may be applied to the movable electrode.

Specifically, in case of the acceleration sensor for the airbag system, the sensor detects extremely high acceleration such as 50 G. Therefore, the sensor has a spring portion having high rigidity. The voltage for detecting the sticking anomaly is also extremely high, for example, over 10 volts. Thus, if a general 5 volts circuit is used for the sensor, it is necessary to add a booster circuit for generating a high voltage more than 10 volts by using a 5 volt power source. In this case, the construction of the circuit becomes complicated. Further, it is necessary to design a part of the circuit to withstand the high voltage, the part at which the high voltage is to be applied.

Thus, it is required for the physical quantity sensor to have self diagnosis function for the sticking anomaly with a simple construction.

SUMMARY OF THE INVENTION

In view of the above-described anomaly, it is an object of the present disclosure to provide a physical quantity sensor.

According to an aspect of the present disclosure, a physical quantity sensor includes: a substrate; a movable element supported on the substrate with a spring, wherein the movable element is displaceable in accordance with a physical quantity along a displacement direction; a pair of fixed elements, each of which is spaced apart from the movable element by a predetermined distance in the displacement direction; a carrier wave application element for applying a pair of carrier waves having a pulse shape to the pair of fixed elements in such a manner that one carrier wave to be applied to one fixed element has a phase opposite to the other carrier wave to be applied to the other fixed element; a signal application element for applying a middle voltage to the movable element, wherein the middle voltage is almost a half of a peak voltage of the carrier wave; and a detection circuit for detecting the physical quantity based on a capacitance change between the movable element and the pair of fixed elements. The signal application element further applies a first self diagnosis signal having a pulse shape to the movable element. The first self diagnosis signal has a first maximum voltage different from the middle voltage. The detection circuit executes a first self diagnosis process based on the capacitance change between the movable element and the pair of fixed elements when the signal application element applies the first self diagnosis signal to the movable element. The first self diagnosis signal has a first frequency, which provides to obtain a resonant magnification equal to or larger than 1.1 times with respect to a resonant frequency of the movable element, so that the movable element is resonated and almost contacts or press contacts one of the pair of fixed elements. The detection circuit determines whether a sticking phenomenon occurs based on the capacitance change between the movable element and the pair of fixed elements when the signal application element applies the first self diagnosis signal to the movable element.

In the above sensor, since displacement of the movable element is obtained by using resonance of the movable element, the voltage of the first self diagnosis signal to be applied to the movable element is comparatively small. Thus, the construction of the sensor becomes simple. The physical quantity sensor has a self diagnosis function for the sticking anomaly with a simple construction.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 2:
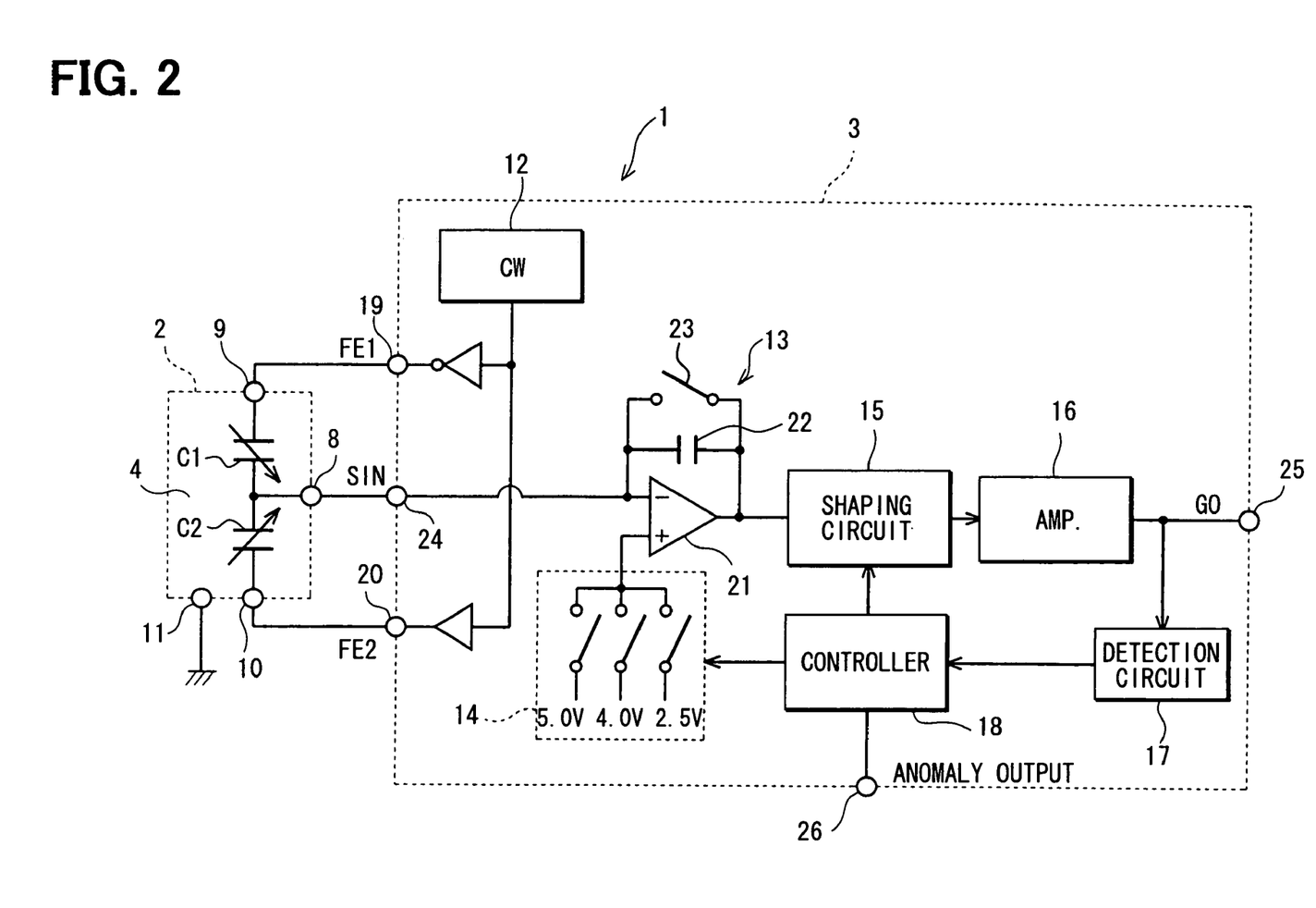
FIG. 2 is a circuit diagram showing a semiconductor acceleration sensor.
Figure 3A:
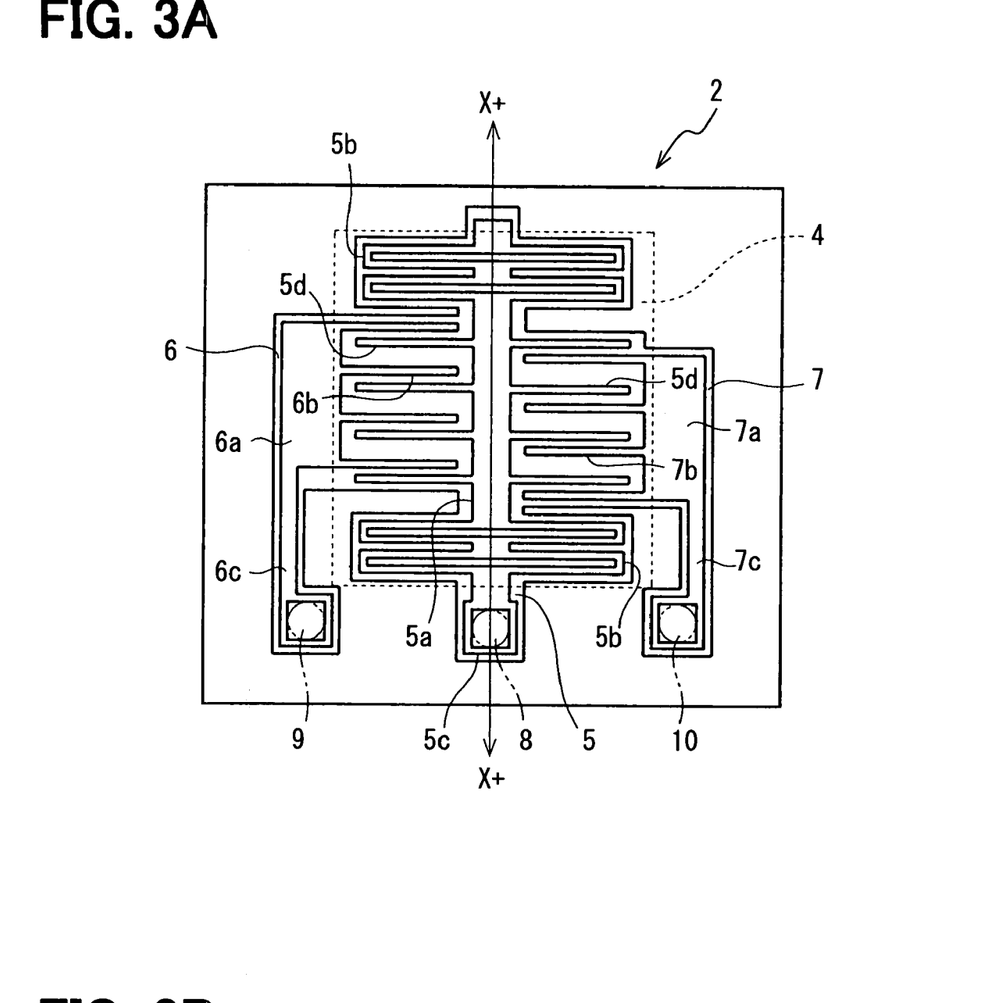
FIG. 3A is a plan view showing an acceleration sensor chip.
Figure 3B:
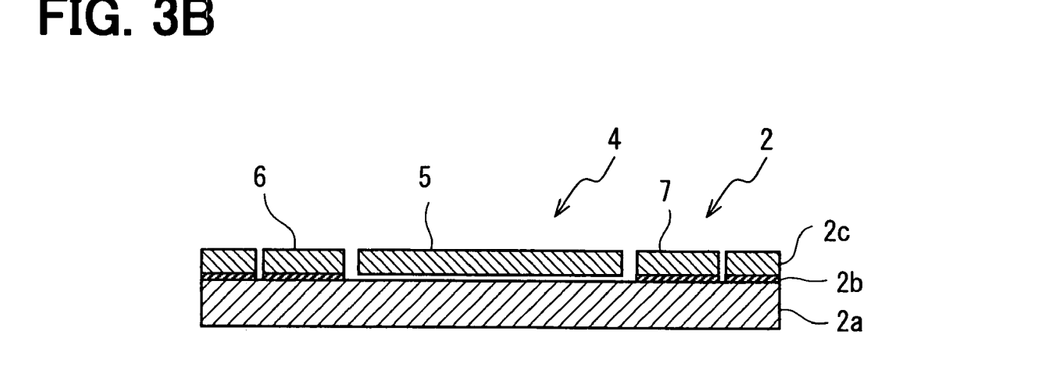
FIG. 3B is a cross sectional view showing the sensor chip.

A physical quantity sensor according to an example embodiment of the present disclosure is shown in FIG. 2. The sensor is, for example, a semiconductor capacitive acceleration sensor 1 for an airbag system of a vehicle. Specifically, the sensor 1 detects collision of the vehicle. FIGS. 3A and 3B show a sensor chip 2 in the sensor 1. The sensor 1 has a stack construction having the sensor chip 2 mounted on a circuit chip 3. The sensor chip 2 together with the circuit chip 3 is accommodated in a ceramic package (not shown).

As shown in FIG. 3B, the sensor chip 2 includes a SOI substrate having a rectangular shape (e.g., a square shape). The SOI substrate as an initial substrate has a support substrate 2a made of silicon, an oxide film 2b and a single crystal silicon layer 2c, which are stacked in this order. A groove is formed on the surface of the single crystal silicon layer 2c by a micro machining method, so that an acceleration detection portion 4 as a physical quantity detection portion is formed. The portion 4 is disposed at a center portion of a rectangular region.

The acceleration detection portion 4 has a detection axis (i.e., X axis) along with one direction. In FIG. 3A, the portion 4 detects the acceleration along with the X direction, i.e., a front-back direction. The portion 4 includes a movable element 5 movable in the X direction according to the acceleration applied to the sensor 1, and a pair of fixed elements 6, 7. The movable element 5 includes a weight portion 5a, a spring portion 5b and an anchor portion 5c. The weight portion 5a is disposed at a center portion of the detection portion 4 and extends along with the X direction. The spring portion 5b is disposed on both ends of the weight portion 5a. The spring portion 5b has a long and thin rectangular shape. The anchor portion 5c is disposed on one end of the spring portion 5b. Further, the movable element 5 includes a movable electrode 5d having multiple thin comb teeth, which are extends to both sides of the weight portion 5a.

The insulation film 2b under the movable element 5 other than 5c is removed. Only the anchor portion 5c is supported on the support substrate 2a through the insulation film 2b so that the movable element 5 is cantilevered. An output terminal as an electrode pad 8 is disposed on the surface of the anchor portion 5c.

The left side fixed element 6 includes a base portion 6a, a fixed electrode 6b and a fixed electrode wiring portion 6c. The base portion 6a has a rectangular shape. The fixed electrode 6b has multiple comb teeth, which extend to a right side from the base portion 6b. The fixed electrode wiring portion 6c extends from the base portion 6a toward the front direction. Each tooth of the fixed electrode 6b is parallel to a tooth of the movable electrode 5d so that a clearance is formed between the tooth of the fixed electrode 6b and the tooth of the movable electrode 5d. A first input terminal 9 as an electrode pad is formed on the surface of a periphery of the fixed electrode wiring portion 6c.

The right side fixed element 7 includes a base portion 7a, a fixed electrode 7b and a fixed electrode wiring portion 7c. The base portion 7a has a rectangular shape. The fixed electrode 7b has multiple comb teeth, which extend to a left side from the base portion 7b. The fixed electrode wiring portion 7c extends from the base portion 7a toward the front direction. Each tooth of the fixed electrode 7b is parallel to a tooth of the movable electrode 5d so that a clearance is formed between the tooth of the fixed electrode 7b and the tooth of the movable electrode 5d. A second input terminal 10 as an electrode pad is formed on the surface of a periphery of the fixed electrode wiring portion 7c.

Thus, a first capacitor C1 is formed between the movable electrode 5d and the fixed electrode 6b, and a second capacitor C2 is formed between the movable electrode 5d and the fixed electrode 7b. Each capacitance of the capacitors C1, C2 is differentially changeable in accordance with movement of the movable element 5 when the acceleration is applied along with the X direction. Thus, the acceleration is detected based on the capacitance change.

The sensor chip 2 includes a GND terminal 11 as an electrode pad. Each terminal of the sensor chip 2 is electrically connected to a terminal of the circuit chip 3 with a bonding wire or a bump.

The circuit chip 3 has a circuit for processing a signal from the sensor chip 2. Specifically, the circuit chip 3 includes a carrier wave output circuit 12, a C-V converter circuit 13, a switching circuit 14, a waveform shaping circuit 15, an output amplifier circuit 16, an anomaly detection circuit 17, a control circuit 18, a micro computer, an oscillation circuit (not shown), a EPROM (not shown), and the like. The carrier wave output circuit 12 applies carrier waves FE1, FE2 to the fixed elements 6, 7, respectively. The C-V converter circuit 13 converts the capacitance change to voltage change. The switching circuit 14 adjusts the voltage and the frequency of a movable electrode voltage to be applied to the movable element 5. The anomaly detection circuit 17 detects an abnormal voltage when the sensor 1 self diagnoses. The control circuit 18 controls the whole of the sensor 1.

Figure 1:
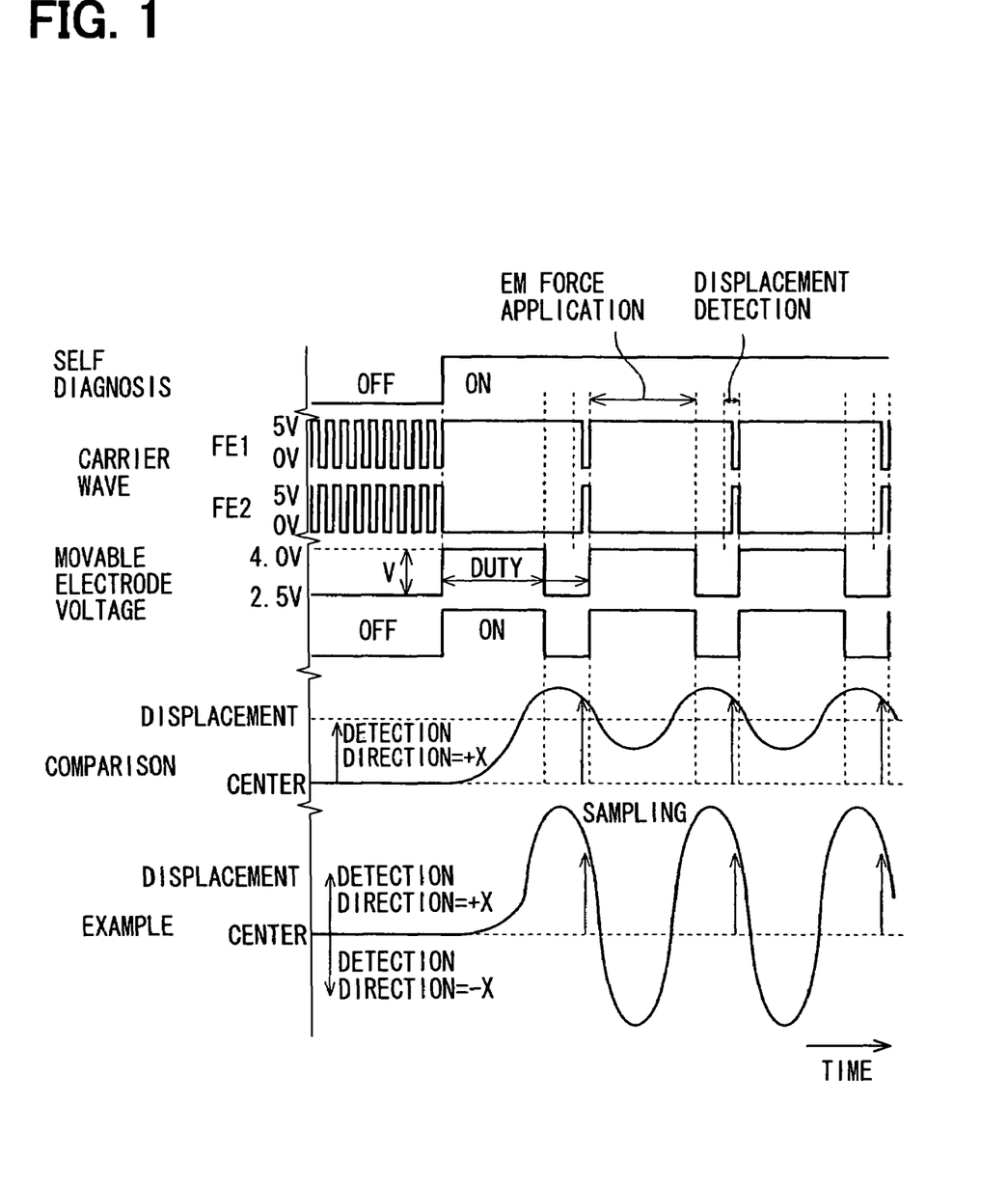
FIG. 1 is a timing chart showing a waveform of a carrier wave, a waveform of a movable element voltage, and a displacement of the movable element.

The carrier wave output circuit 12 outputs the carrier waves FE1, FE2 from two output terminals 19, 20. Each carrier wave FE1, FE2 has a pulse shape and a phase opposite to each other. The output terminals 19, 20 are connected to the first and second input terminals 9, 10 of the sensor chip 2. Thus, the carrier waves FE1, FE2 are applied to the pair of fixed elements 6, 7 of the sensor chip 2. Difference between the phase of the first carrier wave FE1 and the phase of the second carrier wave FE2 is 180 degrees, as shown in FIG. 1.

The carrier wave output circuit 12 outputs the carrier wave FE1, FE2 having the amplitude of 5 volts (the carrier wave oscillates between 0 volt and 5 volts), i.e., the voltage of the wave is 5 volts equal to the power supply voltage, and the frequency of 200 kHz when the sensor 1 is in a normal state. When the sensor 1 performs a self diagnosis step and a sticking diagnosis step, the circuit 12 outputs a self diagnosis signal having the amplitude of 5 volts, the frequency of a self diagnosis frequency and a predetermined duty ratio.

The C-V converter circuit 13 includes an operation amplifier 21, a capacitor 22 and a switch 23. The capacitor 22 and the switch 23 are connected in parallel to each other between a reverse input terminal and an output terminal of the operation amplifier 21. A capacitance change signal Sin from the input terminal 24 of the circuit chip 3 is inputted into the reverse input terminal of the operation amplifier 21. The input terminal 24 is connected to the output terminal 8 of the sensor chip 2. The voltage signal from the switching circuit 14 is inputted into the reverse input terminal of the operation amplifier 21.

The switching circuit 14 inputs a constant voltage (i.e., direct current voltage) of a middle voltage such as 2.5 volts into the non-reverse input terminal of the operation amplifier 21 in the normal state. In the self diagnosis state and in the sticking diagnosis state, the voltage is oscillated between 5 volts and 2.5 volts, and the first self diagnosis signal having a predetermined duty ratio with the first self diagnosis frequency of f and the second self diagnosis signal having another predetermined duty ratio with the second self diagnosis frequency of f2 are inputted.

In the normal state, the middle voltage is applied to the movable element 5 of the sensor chip 2. In the self diagnosis state and in the sticking diagnosis state, the self diagnosis signal is applied between the fixed elements 6, 7. The signal having the voltage and the frequency is switched by the switching circuit 14, and the carrier wave and the self diagnosis signal are switched by the carrier wave output circuit 12. The switching is controlled by the control circuit 18. At this time, frequency adjustment is performed by switching a resistance of a CR oscillation circuit.

The output signal from the C-V converter circuit 13 (i.e., the output terminal of the operation amplifier 21) is shaped by the waveform shaping circuit 15. The shaped signal is amplified by the output amplifier circuit 16, so that the amplified signal is outputted as an acceleration detection signal G0 from the output terminal 25. Further, the acceleration detection signal from the output amplifier circuit 16 is compared with a predetermined voltage within a predetermined range by using the anomaly detection circuit 17. When the acceleration detection signal is out of the predetermined range, the control circuit 18 outputs diagnosis result from the output terminal 26 based on the input signal from the anomaly detection circuit 17.

The control circuit 18 controls the carrier wave output circuit 12, the switch 23 in the C-V converter circuit 13, the switching circuit 14 and the like by using a predetermined software and a predetermined hardware in the control circuit 18. The control circuit 18 executes acceleration detection in the normal state (i.e., other than the self diagnosis state). In the normal state, i.e., in the acceleration detection state, as shown in FIG. 1, the carrier wave output circuit 12 outputs the carrier wave having a frequency of, for example, 200 kHz and a maximum voltage of 5 volts (i.e., the voltage is oscillated between 0 volt and 5 volts), so that the carrier waves FE1, FE2 having a pulse shape are applied to the fixed elements 6, 7, respectively. The carrier waves FE1, FE2 have opposite phases, respectively.

The switching circuit 14 outputs the middle voltage of 2.5 volts to the non-reverse input terminal of the operation amplifier 21. The middle voltage of the movable electrode voltage is applied to the movable element 5. The switch 23 of the C-V converter circuit 13 is turned on by a predetermined intervals corresponding to each cycle of the carrier wave. Thus, the potential difference between the fixed element 6 and the movable element 5 is balanced with the potential difference between the fixed element 7 and the movable element 5. These differences are equal to 2.5 volts. Under this condition, when acceleration is applied to the sensor, the movable element 5 moves along with the X direction. Then, the capacitance of each capacitor C1, C2 is changed in accordance with the displacement of the movable element 5, which corresponds to the acceleration. The capacitance change signal Sin from the sensor chip 2 is processed, so that the acceleration detection signal G0 is outputted from the output terminal 25.

When the signal to execute the self diagnosis process is inputted into the control circuit 18, the self diagnosis process is performed. The self diagnosis process includes two steps. First, a sensitivity diagnosis step for determining whether sensor sensitivity is in an appropriate range is performed. After that, under the condition that the movable element 5 is continuously vibrated after the sensitivity diagnosis step, a sticking diagnosis step for determining whether sticking is occurred is performed.

In the sensitivity diagnosis step, the second self diagnosis signal is applied between the movable element 5 and the fixed elements 6, 7, so that electrostatic force is generated between the movable element 5 and the fixed elements 6, 7. Thus, the balance of potential differences is disturbed, and the movable element 5 is forcedly displaced. Specifically, the movable element 5 is forcedly vibrated in the X direction. Based on the forced vibration of the movable element 5, it is determined whether the output corresponding to the forced displacement is obtained. Specifically, it is determined whether the capacitance change corresponding to the forced displacement is obtained.

At this time, the second self diagnosis signal to be applied to the fixed elements 6, 7 has a pulse shape vibrating between 0 volt and 5 volts, as shown in FIG. 1. The second self diagnosis signal has the second self diagnosis frequency f2, which is near the resonance frequency of the movable element 5, and capable of obtaining a resonance magnification ratio lower than the first self diagnosis signal. A predetermined duty ratio that the time when the voltage of the fixed element 6 is 5 volts (i.e., the voltage of the fixed element 7 is 0 volt) is sufficiently long, and that the time when the voltage of the fixed element 7 is 5 volts (i.e., the voltage of the fixed element 6 is 0 volt) is sufficiently short is obtained.

Figure 4:
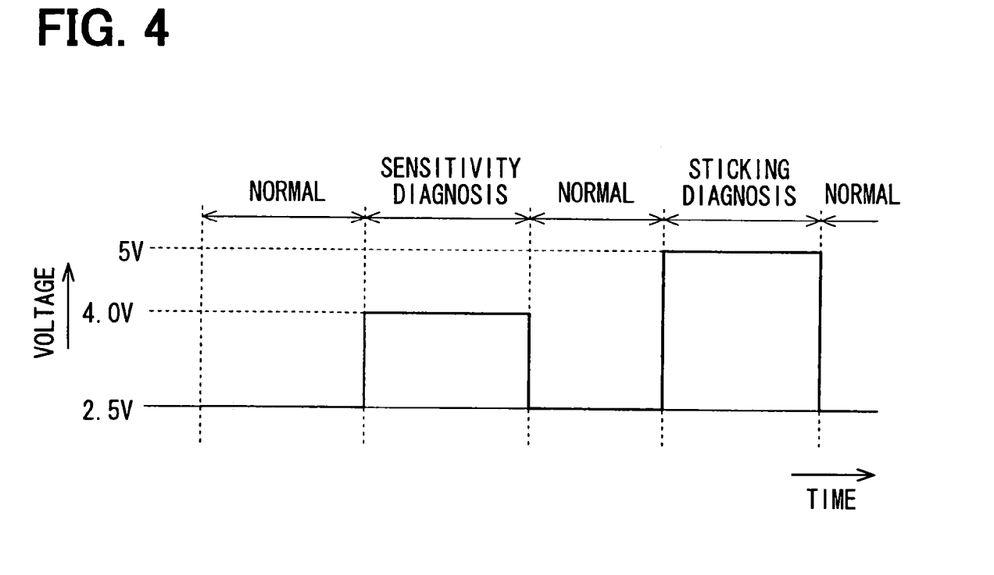
FIG. 4 is a graph showing a movable element voltage in the sensor chip.

As shown in FIG. 4, when the sensitivity is detected, a signal outputted from the switch 14 that is the second self diagnosis signal to be applied to the movable element 5 has a voltage amplitude in a range between the middle voltage of 2.5 volts and 4.0 volts. Further, the signal has a frequency as the self diagnosis frequency f2, and a duty ratio, in which a time of a high voltage side per one period is comparatively long and a time of a low voltage side (i.e., a 2.5-volt side) is comparatively short. Displacement detection, i.e. sampling of displacement, of the movable element 5 is performed at a timing when a signal to be applied to the fixed elements 6, 7 is switched.

Figure 5:
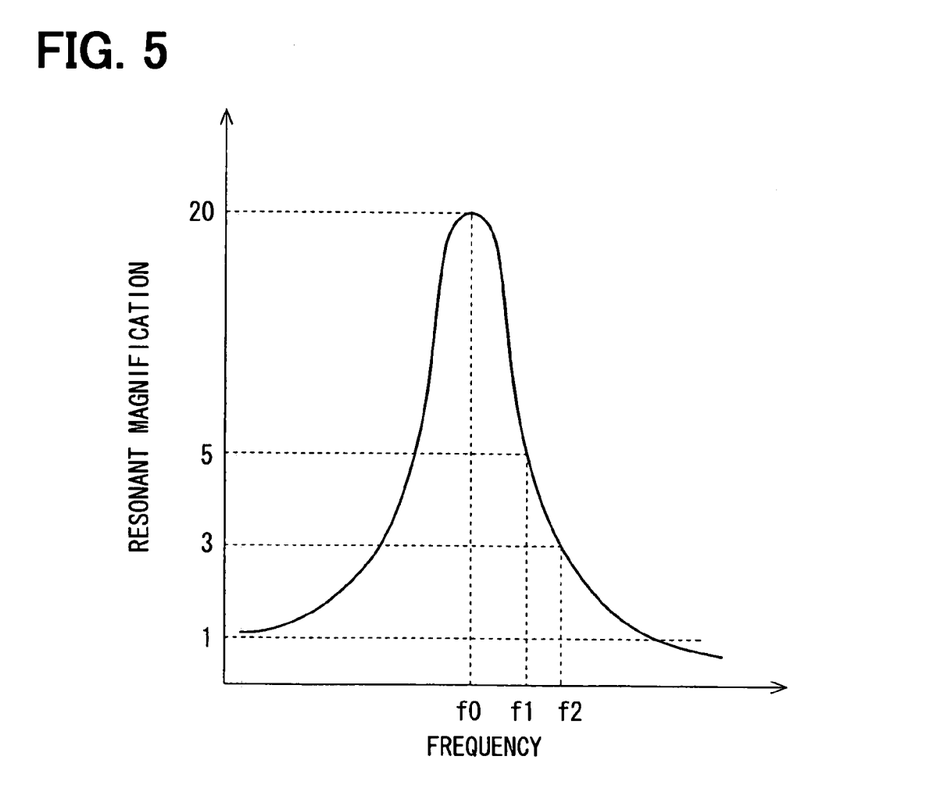
FIG. 5 is a graph showing a relationship between a frequency and a resonant magnification in the movable element.

FIG. 5 shows the relationship between the frequency and the resonant magnification of the movable element 5. The resonant magnification is about twenty at the resonant frequency f0, for example. In this embodiment, the frequency f of the first self diagnosis signal is set in a range between f0 and f1 so as to obtain the resonance magnification equal to or larger than five and equal to or smaller than twenty. For example, the frequency f of the first self diagnosis signal is 7 kHz. This frequency f provides the resonant magnification larger than that of the second self diagnosis signal. For example, the resonance magnification of the first self diagnosis frequency f is five, which is larger than the resonance magnification of the second self diagnosis frequency, i.e., three.

In the sticking diagnosis step, the first self diagnosis signal is applied between the movable element 5 and the fixed elements 6, 7 so that the movable element 5 is resonated to increase the amplitude of vibration of the movable element 5 in the X direction. Thus, the displacement of the movable element 5 is enlarged to contact the fixed elements 6, 7. The movable element 5 almost contacts the fixed elements 6, 7, or press contacts the fixed elements 6, 7. Based on the monitoring of the output, i.e., capacitance change, it is determined whether the contacted movable element 5 returns.

At this time, the first self diagnosis signal to be applied to the fixed elements 6, 7 has a frequency higher than that of the signal (i.e., the second self diagnosis signal) in the sensitivity diagnosis step. Thus, the resonant magnification of the first self diagnosis signal in the sticking diagnosis step is higher than that of the second self diagnosis signal in the sensitivity diagnosis step. As shown in FIG. 4, the signal outputted from the switch 14 that is the first self diagnosis signal to be applied to the movable element 5 has a frequency f higher than that in the sensitivity diagnosis step and a duty ratio almost equal to that in the sensitivity diagnosis step. Further, the signal in the sticking diagnosis step has a voltage, which is different from the voltage in the sensitivity diagnosis step. For example, the movable electrode voltage of the signal in the sticking diagnosis step has a voltage amplitude in a range between 2.5 volts and 5 volts. The timing of displacement detection of the movable element 5, i.e., sampling timing of the movable element 5, in the sticking diagnosis step is the same as the sensitivity diagnosis step.

Thus, the carrier wave output circuit 12, the switching circuit 14 and the like provide a signal application means. The C-V converter circuit 13, the waveform shaping circuit 15, the output amplifier circuit 16, the anomaly detection circuit 17, the control circuit 18 and the like provide a self diagnosis means.

In the semiconductor acceleration sensor 1, the signal for instructing execution of the self diagnosis is inputted. Then, the control circuit 18 executes the self diagnosis step including the sensitivity diagnosis step and the sticking diagnosis step. Firstly, the sensitivity diagnosis step is performed, and then, the sticking diagnosis step is performed. Although the sticking diagnosis step is performed just after the sensitivity diagnosis step is performed, an acceleration detection state, i.e., normal state, may be performed after the sensitivity diagnosis step is performed, and then, the sticking diagnosis step may be performed, as shown in FIG. 4.

In the sensitivity diagnosis step, the second self diagnosis signal is applied between the fixed elements 6, 7 and the movable element 5. At this time, as shown in FIG. 1, the carrier waves FE1, FE2 to be applied to the fixed elements 6, 7 have a pulse shape with amplitude from 0 volt and 5 volts. Further, each carrier wave FE1, FE2 has a frequency equal to the second self diagnosis frequency f2, which is near the resonant frequency of the movable element 5 and provides a resonant magnification lower than that of the first self diagnosis signal. Furthermore, a duty ratio of each carrier wave FE1, FE2 is such that the time of the 5-volt period of the fixed element 6 side (in this case, the voltage of the fixed element 7 is 0 volt) is sufficiently long and the time of the 5-volt period of the fixed element 7 side (in this case, the voltage of the fixed element 6 is 0 volt) is sufficiently short.

On the other hand, a signal to be applied to the movable element 5 that is a signal outputted from the switching circuit 14 has a voltage amplitude in a range between the middle voltage of 2.5 volts and 4.0 volts, a frequency equal to the second self diagnosis frequency f2, and a duty ratio such that the time of the high voltage side is comparatively long and the time of the low voltage side (i.e., 2.5-volt side) is comparatively short.

Thus, during a period in which a high voltage such as 4 volts higher than the middle voltage of 2.5 volts is applied to the movable element 5, electrostatic force acts (i.e., turns on) between the movable element 5 and the fixed elements 6, 7. Thus, the movable element 5 is displaced from the middle position to one of the fixed element 6 along the +X direction. When the voltage of the movable element 5 returns to 2.5 volts, the electrostatic force does not act (i.e., turns off). Thus, the movable element 5 returns to the middle position. These displacement cycles are repeated with a frequency near the resonant frequency f0. The movable element 5 resonates with the resonant magnification equal to or larger than five, and the movable element 5 vibrates with large displacement between a +X side and a −X side.

As shown in FIG. 1, the displacement detection is performed at a predetermined timing after the electrostatic force turns on and before the carrier waves FE1, FE2 to be applied to the fixed elements 6, 7 are switched. When the displacement detection (i.e., sampling of detection) is performed, it is determined whether the acceleration detection signal G0 outputted from the output amplifier circuit 16 has a voltage corresponding to the displacement of the movable element 5. Thus, it is determined whether the sensitivity of he sensor is sufficient and whether there is a foreign particle in a clearance of the sensor, the particle disturbing the displacement of the movable element 5. Here, when the phase of each carrier wave FE1, FE2 to be applied to the fixed elements 6, 7 is reversed (i.e., switched reversely), the displacement of the movable element 5 in the −X direction is detected.

As shown in FIG. 1, in a comparison sensor, a movable element only moves on one side, e.g., +X side. Accordingly, the comparison sensor cannot detect anomaly on the other side, e.g., −X side. However, in the sensor 1 according to the present embodiment, the movable element 5 can be displaced on both sides, i.e., the +X side and the −X side, so that the sensitivity diagnosis (e.g., anomaly diagnosis) is performed on both sides. Further, although the voltage to be applied to the movable element 5 is small, the displacement of the movable element 5 is comparatively large.

In the sticking diagnosis to be performed next, the movable element 5 is forcedly vibrated in the sensitivity diagnosis step, and this vibration continues. Under this condition, the first self diagnosis signal is applied between the fixed elements 6, 7 and the movable element 5. At this time, the carrier waves FE1, FE2 having a waveform, a frequency and a duty ratio corresponding to the first self diagnosis signal are applied to the fixed elements 6, 7. The signal to be applied to the movable element 5 that is a signal outputted from the switching circuit 14 has a voltage amplitude in a range between the middle voltage of 2.5 volts and the high voltage of 5 volts in the sensitivity diagnosis step. Further, the signal has a frequency equal to the self diagnosis frequency f and a duty ratio such that the time of the high voltage side is comparatively long and the time of the low voltage side is comparatively short.

Thus, during a period in which a high voltage such as 5 volts higher than the middle voltage of 2.5 volts is applied to the movable element 5, electrostatic force acts (i.e., turns on) between the movable element 5 and the fixed elements 6, 7. Thus, the movable element 5 is displaced from the middle position to the fixed element 6 along the +X direction. At this time, since the voltage in the sticking diagnosis step is larger than that in the sensitivity diagnosis step, the displacement of the movable element 5 becomes larger than that in the sensitivity diagnosis step. When the voltage of the movable element 5 returns to 2.5 volts, the electrostatic force does not act (i.e., turns off). Thus, the movable element 5 returns to the middle position. These displacement cycles are repeated with a frequency near the resonant frequency f0. The movable element 5 resonates with the resonant magnification equal to or larger than five, and the movable element 5 vibrates with large displacement between a +X side and a −X side.

Since the voltage to be applied to the movable element 5 is larger than that in the sensitivity diagnosis step, the displacement of the movable element 5 becomes larger. Thus, the movable element 5 forcedly contacts the fixed elements 6, 7. The present inventor has studied that the displacement of the movable element 5 is sufficiently large so that the movable element 5 contacts the fixed elements 6, 7 even when the voltage of the carrier wave is smaller than five volts in a case where the self diagnosis frequency f is near the resonant frequency f0 of the movable element 5 and the resonant magnification is equal to or larger than five.

Here, if the movable element 5 is stuck to the fixed element 6, 7 by electrical factor or surface state factor such as moisture and a particle so that the sticking phenomenon occurred when the movable element 5 contacts the fixed element 6, 7, the movable element 5 may not return. In this case, the displacement of the movable element 5 and the output from the sensor are disturbed. Accordingly, the acceleration detection signal outputted from the output amplifier circuit 16 at a sampling time is compared with a voltage in a predetermined range by using the anomaly detection circuit 17, so that it is determined whether the sticking phenomenon occurs. Specifically, it is determined whether the acceleration detection signal is disposed between an upper limit and a lower limit.

When the anomaly is detected, a signal corresponding to the anomaly is outputted from the output terminal 26. Here, the sticking diagnosis step is easily performed when the sensor 1 is actually used, and further, easily performed in a manufacturing process of the sensor 1. Thus, in the manufacturing process, a product of the sensor 1 having sticking anomaly is removed.

Thus, the sensor 1 can determine in the self diagnosis step whether the sticking phenomenon occurs. In the sticking diagnosis step, the movable element 5 is forcedly displaced by using the resonance of the movable element 5 so that the movable element 5 contacts the fixed elements 6, 7. Accordingly, the voltage of the first self diagnosis signal to be applied to the movable element 5 can be set to comparatively low. Accordingly, the sticking diagnosis step can be performed without adding a high voltage generation circuit to the sensor 1. Thus, the sensor 1 has a simple construction.

Since a signal to be applied between the fixed elements 6, 7 and the movable element 5 is switched to the second self diagnosis signal so that it is determined whether the sensitivity of the sensor 1 is sufficient. In this case, the movable element 5 is displaced toward the fixed element 6, 7 by using the resonance of the movable element 5 even though the voltage of the movable element 5 is comparatively low. Thus, self diagnosis (i.e., anomaly diagnosis) can be performed on both sides, i.e., both of the fixed element 6 side and the fixed element 7 side. Further, the first self diagnosis signal and the second self diagnosis signal are switched only by changing the voltage to be applied to the movable element 5. Thus, the switching the signal is easily performed with a simple construction.

Further, the movable element 5 is vibrated in the sensitivity diagnosis step, and under this vibrating condition, the sticking diagnosis step is performed without stopping the vibration of the movable element 5. Thus, the diagnosis time is reduced, compared with a case where the movable element 5 is stopped to vibrate after the sensitivity diagnosis step and before the sticking diagnosis step.

When physical quantity in a predetermined normal range is applied to the sensor 1, and the movable element 5 contacts the fixed element 6, 7, the physical quantity may not be detected. Thus, in general, when the physical quantity in the normal range is inputted in the sensor 1, elasticity in the sensor is appropriately designed not to contact the movable element 5 with the fixed elements 6, 7. Further, the sensor sensitivity is sufficiently high in the normal range. When the sensitivity diagnosis step is performed, it is preferred that the movable element 5 is sufficiently spaced apart from the fixed elements 6, 7. Thus, in the sensor 1 according to this embodiment, the voltage in the sensitivity diagnosis step is set to be smaller than the voltage in the sticking diagnosis step. Further, the resonant magnification of the second self diagnosis signal is set to be smaller than that of the first self diagnosis signal, so that the sensitivity to be diagnosed in the self diagnosis step is set to be in the normal range.

In the above sensor 1, both of the voltage and the frequency of the first self diagnosis signal to be applied to the movable element 5 are different from those of the second self diagnosis signal, respectively. Alternatively, the first self diagnosis signal may be switched to the second self diagnosis signal by changing the voltage to be applied to the movable element 5. Alternatively, the first self diagnosis signal may be switched to the second self diagnosis signal by changing the frequency of the signal to be applied to the movable element 5 without changing the voltage of the signal. For example, the voltage to be applied to the movable element 5 is set to be 4 volts, and to oscillate between 2.5 volts and 4 volts. As shown in FIG. 5, the frequency of the first self diagnosis signal is set to be in a range between f0 and f1 so as to obtain the resonant magnification equal to or larger than five and equal to or smaller than twenty. Further, the frequency f2 of the second self diagnosis signal is set to be in a range between f1 and f2 so as to obtain the resonant magnification equal to or larger than three and equal to or smaller than five.

Although the sensor is the semiconductor acceleration sensor, the sensor may be a capacitive semiconductor sensor such as a yaw rate sensor. Further, the sensor may be a physical quantity sensor having two detection axes. Further, since the voltage, the frequency and the resonant magnification in the present embodiment are merely examples, they may be different values in accordance with a condition of the sensor.

The present disclosure has the following aspects.

According to an aspect of the present disclosure, a physical quantity sensor includes: a substrate; a movable element supported on the substrate with a spring, wherein the movable element is displaceable in accordance with a physical quantity along a displacement direction; a pair of fixed elements, each of which is spaced apart from the movable element by a predetermined distance in the displacement direction; a carrier wave application element for applying a pair of carrier waves having a pulse shape to the pair of fixed elements in such a manner that one carrier wave to be applied to one fixed element has a phase opposite to the other carrier wave to be applied to the other fixed element; a signal application element for applying a middle voltage to the movable element, wherein the middle voltage is almost a half of a peak voltage of the carrier wave; and a detection circuit for detecting the physical quantity based on a capacitance change between the movable element and the pair of fixed elements. The signal application element further applies a first self diagnosis signal having a pulse shape to the movable element. The first self diagnosis signal has a first maximum voltage different from the middle voltage. The detection circuit executes a first self diagnosis process based on the capacitance change between the movable element and the pair of fixed elements when the signal application element applies the first self diagnosis signal to the movable element. The first self diagnosis signal has a first frequency, which provides to obtain a resonant magnification equal to or larger than 1.1 times with respect to a resonant frequency of the movable element, so that the movable element is resonated and almost contacts or press contacts one of the pair of fixed elements. The detection circuit determines whether a sticking phenomenon occurs based on the capacitance change between the movable element and the pair of fixed elements when the signal application element applies the first self diagnosis signal to the movable element.

In the above sensor, since displacement of the movable element is obtained by using resonance of the movable element, the voltage of the first self diagnosis signal to be applied to the movable element is comparatively small. Thus, the construction of the sensor becomes simple. The physical quantity sensor has a self diagnosis function for the sticking anomaly with a simple construction.

Alternatively, the signal application element may further apply a pair of first self diagnosis waves having a pulse shape to the pair of fixed elements when the detection circuit executes the first self diagnosis process in such a manner that one first self diagnosis wave to be applied to one fixed element has a phase opposite to the other first self diagnosis wave to be applied to the other fixed element. Each first self diagnosis wave has a maximum voltage equal to the peak voltage. Each first self diagnosis wave has a frequency equal to the first frequency of the first self diagnosis signal. The detection circuit determines whether the sticking phenomenon occurs based on the capacitance change between the movable element and the pair of fixed elements when the signal application element applies the first self diagnosis signal to the movable element and applies the pair of first self diagnosis waves to the pair of fixed elements. Further, the first frequency may provide to obtain the resonant magnification equal to or larger than five times with respect to the resonant frequency of the movable element. Further, the signal application element may further apply a second self diagnosis signal to the movable element. The second self diagnosis signal has a second frequency, which provides to obtain a resonant magnification lower than the resonant magnification of the first self diagnosis signal, and the detection circuit determines whether a sensitivity of the sensor is disposed in a predetermined range based on the capacitance change between the movable element and the pair of fixed elements when the signal application element applies the second self diagnosis signal to the movable element. Furthermore, the signal application element may further apply a pair of second self diagnosis waves having a pulse shape to the pair of fixed elements when the detection circuit executes the second self diagnosis process in such a manner that one second self diagnosis wave to be applied to one fixed element has a phase opposite to the other second diagnosis wave to be applied to the other fixed element. The second self diagnosis wave has a frequency equal to the second frequency of the second self diagnosis signal, and the detection circuit determines whether the sensitivity of the sensor is disposed in the predetermined range based on the capacitance change between the movable element and the pair of fixed elements when the signal application element applies the second self diagnosis signal to the movable element and applies the pair of second self diagnosis waves to the pair of fixed elements. Further, the second self diagnosis signal may have a second maximum voltage different from the first maximum voltage. Furthermore, the detection circuit may execute a second self diagnosis when the signal application element applies the second self diagnosis signal to the movable element before the detection circuit executes the first self diagnosis, and the detection circuit starts to execute the first self diagnosis while the movable element is oscillated by the second self diagnosis signal. Further, the second maximum voltage may be disposed between the middle voltage and the first maximum voltage. The first maximum voltage is equal to the peak voltage of the carrier wave. The first self diagnosis signal has a first duty ratio between a first maximum voltage step and a first minimum voltage step. The first self diagnosis signal at the first maximum voltage step has the first maximum voltage, and the first self diagnosis signal at the first minimum voltage step has a predetermined first minimum voltage. The first duty ratio signal is larger than one. The second self diagnosis signal has a second duty ratio between a second maximum voltage step and a second minimum voltage step. The second self diagnosis signal at the second maximum voltage step has the second maximum voltage, and the second self diagnosis signal at the second minimum voltage step has a predetermined second minimum voltage. The second duty ratio is larger than one. Furthermore, the first minimum voltage may be equal to the middle voltage, and the second minimum voltage is equal to the middle voltage. The first self diagnosis wave has a first wave duty ratio between a first wave maximum voltage step and a first wave minimum voltage step. The first self diagnosis wave at the first wave maximum voltage step has the maximum voltage equal to the peak voltage, and the first self diagnosis wave at the first wave minimum voltage step has a predetermined wave minimum voltage. The first wave duty ratio is larger than the first duty ratio of the first self diagnosis signal. The second self diagnosis wave has a second wave duty ratio between a second wave maximum voltage step and a second wave minimum voltage step. The second diagnosis wave at the second wave maximum voltage step has the maximum voltage equal to the peak voltage, and the second self diagnosis wave at the second wave minimum voltage step has a predetermined wave second minimum voltage. The second wave duty ratio is larger than the second duty ratio.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:
1. A physical quantity sensor comprising:
   a substrate;
   a movable element supported on the substrate with a spring, wherein the movable element is displaceable in accordance with a physical quantity along a displacement direction;

a pair of fixed elements, each of which is spaced apart from the movable element by a predetermined distance in the displacement direction;

a carrier wave application element for applying a pair of carrier waves having a pulse shape to the pair of fixed elements in such a manner that one carrier wave to be applied to one fixed element has a phase opposite to the other carrier wave to be applied to the other fixed element;

a signal application element for applying a middle voltage to the movable element, wherein the middle voltage is almost a half of a peak voltage of the carrier waves; and a detection circuit for detecting the physical quantity based on a capacitance change between the movable element and the pair of fixed elements, wherein the signal application element further applies a first self diagnosis signal having a pulse shape to the movable element, the first self diagnosis signal has a first maximum voltage different from the middle voltage, the detection circuit executes a first self diagnosis process based on the capacitance change between the movable element and the pair of fixed elements when the signal application element applies the first self diagnosis signal to the movable element, the first self diagnosis signal has a first frequency, which provides to obtain a resonant magnification equal to or larger than 1.1 times with respect to a resonant frequency of the movable element, so that the movable element is resonated and almost contacts or press contacts one of the pair of fixed elements, the detection circuit determines whether a sticking phenomenon occurs based on the capacitance change between the movable element and the pair of fixed elements when the signal application element applies the first self diagnosis signal to the movable element, the signal application element further applies a pair of first self diagnosis waves having a pulse shape to the pair of fixed elements when the detection circuit executes the first self diagnosis process in such a manner that one first self diagnosis wave to be applied to one fixed element has a phase opposite to the other first self diagnosis wave to be applied to the other fixed element, each first self diagnosis wave has a maximum voltage equal to the peak voltage, each first self diagnosis wave has a frequency equal to the first frequency of the first self diagnosis signal, the detection circuit determines whether the sticking phenomenon occurs based on the capacitance change between the movable element and the pair of fixed elements when the signal application element applies the first self diagnosis signal to the movable element and applies the pair of first self diagnosis waves to the pair of fixed elements, and the signal application element further applies a second self diagnosis signal to the movable element, the second self diagnosis signal has a second frequency, which provides to obtain a resonant magnification lower than the resonant magnification of the first self diagnosis signal, and the detection circuit determines whether a sensitivity of the sensor is disposed in a predetermined range based on the capacitance change between the movable element and the pair of fixed elements when the signal application element applies the second self diagnosis signal to the movable element.

2. The sensor according to claim 1, wherein
the first frequency provides to obtain the resonant magnification equal to or larger than five times with respect to the resonant frequency of the movable element.

3. The sensor according to claim 1, wherein
the signal application element further applies a pair of second self diagnosis waves having a pulse shape to the pair of fixed elements when the detection circuit executes a second self diagnosis process in such a manner that one second self diagnosis wave to be applied to one fixed element has a phase opposite to the other second diagnosis wave to be applied to the other fixed element, each second self diagnosis wave has a frequency equal to the second frequency of the second self diagnosis signal, and the detection circuit determines whether the sensitivity of the sensor is disposed in the predetermined range based on the capacitance change between the movable element and the pair of fixed elements when the signal application element applies the second self diagnosis signal to the movable element and applies the pair of second self diagnosis waves to the pair of fixed elements.

4. The sensor according to claim 3, wherein
the second self diagnosis signal has a second maximum voltage different from the first maximum voltage.

5. The sensor according to claim 4, wherein
the detection circuit executes the second self diagnosis process when the signal application element applies the second self diagnosis signal to the movable element before the detection circuit executes the first self diagnosis process, and the detection circuit starts to execute the first self diagnosis process while the movable element is oscillated by the second self diagnosis signal.

6. The sensor according to claim 5, wherein
the second maximum voltage is disposed between the middle voltage and the first maximum voltage, the first maximum voltage is equal to the peak voltage of the carrier waves, the first self diagnosis signal has a first duty ratio between a first maximum voltage step and a first minimum voltage step, the first self diagnosis signal at the first maximum voltage step has the first maximum voltage, and the first self diagnosis signal at the first minimum voltage step has a predetermined first minimum voltage, the first duty ratio is larger than one, the second self diagnosis signal has a second duty ratio between a second maximum voltage step and a second minimum voltage step, the second self diagnosis signal at the second maximum voltage step has the second maximum voltage, and the second self diagnosis signal at the second minimum voltage step has a predetermined second minimum voltage, and the second duty ratio is larger than one.

7. The sensor according to claim 6, wherein
the first minimum voltage step is equal to the middle voltage step, and the second minimum voltage step is equal to the middle voltage step, the first self diagnosis waves have a first wave duty ratio between a first wave maximum voltage step and a first wave minimum voltage step, the first self diagnosis waves at the first wave maximum voltage step have the maximum voltage equal to the peak voltage, and the first self diagnosis waves at the first wave minimum voltage step have a predetermined wave minimum voltage, the first wave duty ratio is larger than the first duty ratio of the first self diagnosis signal, the second self diagnosis waves have a second wave duty ratio between a second wave maximum voltage step and a second wave minimum voltage step, the second self diagnosis waves at the second wave maximum voltage step have the maximum voltage equal to the peak voltage, and the second self diagnosis waves at the second wave minimum voltage step have a predetermined wave second minimum voltage, and the second wave duty ratio is larger than the second duty ratio of the second self diagnosis signal.

* * * * *